(12) United States Patent
Monteiro De Lima (10) Patent No.: US 9,841,094 B2
(45) Date of Patent: Dec. 12, 2017

(54) AUTOMATIC CONTINUOUSLY VARIABLE INERTIAL TRANSMISSION

(71) Applicant: Alan Miranda Monteiro De Lima, Rio de Janeiro (BR)

(72) Inventor: Alan Miranda Monteiro De Lima, Rio de Janeiro (BR)

( * ) Notice: Subject to any disclaimer, the term of this patent is extended or adjusted under 35 U.S.C. 154(b) by 171 days.

(21) Appl. No.: 14/366,972

(22) PCT Filed: Dec. 18, 2012

(86) PCT No.: PCT/BR2012/000517
§ 371 (c)(1),
(2) Date: Jun. 19, 2014

(87) PCT Pub. No.: WO2013/091051
PCT Pub. Date: Jun. 27, 2013

(65) Prior Publication Data
US 2014/0357443 A1 Dec. 4, 2014

(30) Foreign Application Priority Data
Dec. 20, 2011 (BR) .................................... 1106964

(51) Int. Cl.
*F16H 47/08* (2006.01)
*F16H 3/44* (2006.01)
*F16H 3/72* (2006.01)

(52) U.S. Cl.
CPC .............. *F16H 47/08* (2013.01); *F16H 3/44* (2013.01); *F16H 3/72* (2013.01)

(58) Field of Classification Search
CPC ............. F16H 47/12; F16H 47/08; F16H 3/72

USPC .......................................................... 192/42
See application file for complete search history.

(56) References Cited

U.S. PATENT DOCUMENTS

| 4,040,310 A * | 8/1977 | Giroux .................... B60K 17/14 475/48 |
| 5,213,551 A * | 5/1993 | Antonov .................. F16D 43/08 192/103 A |
| 6,892,599 B2 | 5/2005 | Bjørkgå |
| 7,951,039 B2 | 5/2011 | Hart et al. |
| 2003/0125150 A1* | 7/2003 | Tanzer ....................... F16H 3/54 475/150 |
| 2005/0194787 A1* | 9/2005 | Tilscher ................ F03D 7/0284 290/8 |
| 2007/0049453 A1* | 3/2007 | Nagai .................. F16H 61/0295 475/254 |

(Continued)

FOREIGN PATENT DOCUMENTS

| BR | MU8500006-0 | 8/2006 |
| GB | 1230410 | 5/1971 |
| JP | 2006/170426 | 6/2006 |

OTHER PUBLICATIONS

International Search Report for PCT/BR2012/000517 dated Mar. 8, 2013.

*Primary Examiner* — Stacey Fluhart
(74) *Attorney, Agent, or Firm* — B. Aaron Schulman, Esq.; Stites & Harbison, PLLC (57) ABSTRACT

The present invention relates to a gear system with automatic operation designed to transmit the torque from the engine of an automotive vehicle to the driven wheels of the vehicle, in which changes in the vehicle speed is controlled as a function of the torque generated by the engine and of the linear momentum of the vehicle.

4 Claims, 8 Drawing Sheets

(56) References Cited

U.S. PATENT DOCUMENTS

| | | |
|---|---|---|
| 2008/0300081 A1 | 12/2008 | Meitin |
| 2010/0108455 A1* | 5/2010 | Shirataki .............. F16D 41/066 <br> 192/45.008 |
| 2011/0179891 A1* | 7/2011 | Jorg ...................... B60K 6/365 <br> 74/15.8 |
| 2011/0245015 A1 | 10/2011 | Vedeneev |
| 2011/0251010 A1* | 10/2011 | Grimm ................ F16C 17/047 <br> 475/159 |

* cited by examiner

AUTOMATIC CONTINUOUSLY VARIABLE INERTIAL TRANSMISSION

FIELD OF THE INVENTION

The present invention has its field of application among gear systems for the transmission of torque from an engine to the drive wheels. Belongs to the mechanical engineering field and deals with a model of a continuously variable transmission, made up of a gearbox located between the drive shaft and the driven shaft of self-propelled vehicles.

DESCRIPTION OF THE PREVIOUS ART

The gear system designed to transmit torque from an automotive vehicle at the drive wheels is also known as a transmission or gearbox. The main types of transmissions for automotive vehicles are manual transmission, automatic transmission and transmission type CVT (Continuously Variable Transmission).

Manual transmissions work with gears of different sizes and are individually engaged and disengaged, since the automatic transmission systems using a gear system comprises a sun gear assembly comprising, reduction gears and crown gears varied number and sizes of the different gears (different number of teeth). In these systems the gears are engaged with each other and the relationship of force/velocity is given according to the relationship between the connected gears.

There is also the transmission system type CVT (Continuously Variable Transmission) that simulates an infinite number of gear ratios, since it works usually for a set consisting of a belt that connects a system of two pulleys of varying sizes. Cones, spheres, tori, and other ingenious solutions are used in type CVT transmissions for transmitting torque and continuously variable manner.

On vehicles equipped with manual transmission, the need for gear shifting is performed by the driver and the constant act of driving the car becomes tiresome, despite obtaining a rapid response from the vehicle during a gear change. For vehicles equipped with automatic transmission or CVT these responses are not fast, but comfort in the act of driving is much higher. Most commercial CVT systems are also based on the transmission of torque by friction between parts with sections of variable geometry. Just because it depends of friction, it has reduced reliability and scalability compared with fully engaged gears solutions. Another weakness of CVTs is the process of choosing the ideal gear ratio for each situation, usually delayed and based on complex electronic systems.

The present invention provides solutions for the three problems mentioned: allows comfortable driving, with all the benefits of a CVT; eliminates problems related to the transfer of torque through friction, and implements a simple, instant and fully mechanical feedback, the gear relationship is optimized and based only on the inertia of the vehicle.

The state of art mentions several documents with multiple solutions to problems related to the discomfort caused by the constant shifting of the manual transmission or related to slow response of vehicles with automatic transmission or CVT systems.

The document BR MU8500006-0 (André Luis A. Ribeiro) describes an electro-magnetic mechanism bi-articulated for semi-automatic transmissions, which aims to increase comfort in gear changes without harming the recovery speed, being particularly suitable for motorcycles.

The document U.S. Pat. No. 6,892,599 (Kongsberg Automotive ASA) describes a manual transmission containing hydraulic cylinders that facilitate the engagement and disengagement of the gears partially mitigating the existing discomfort in constant gear shifting.

The document CA 2736931 (Automatic Transmissions, LTD) describes an automatic transmission that uses two or more stages of planetary for automatic gear shifting, which makes unnecessary the gear disengagement and the presence of control equipment. This transmission, however, does not solve the problem of the existing delay on gear shifting.

The document U.S. Pat. No. 7,951,039 (GM Global Technology Operations LLC) describes an automatic transmission containing 8 gears ratios, which are engaged due to small variations of engine torque. This technology aims to improve vehicle response by increasing the number of gears.

SUMMARY OF THE INVENTION

The present invention relates to an automatic inertial continuously variable transmission able to transmit torque from an engine to its wheels, being preferably, an automatic transmission with shift control of vehicle speed as a function of the torque generated by the engine and the moment of inertia in which the vehicle is.

This aim is achieved by means of an automatic inertial continuously variable transmission comprising a gear set, a drive shaft, scaling elements, a driven shaft and a lock.

The drive shaft comes from an engine of a vehicle and drives the rotation generated by the engine to the scaling elements. The latter will spin down and will transfer the resultant force to a driven shaft providing thereby movement to the wheels.

BRIEF DESCRIPTION OF THE FIGURES

In order to facilitate the understanding of the present invention, the attached drawings illustrate representations of its possible embodiments.

DETAILED DESCRIPTION OF THE INVENTION

The invention will be better understood from the detailed description that follows with the aid of the figures, which are integral parts of this document.

Figure 1:
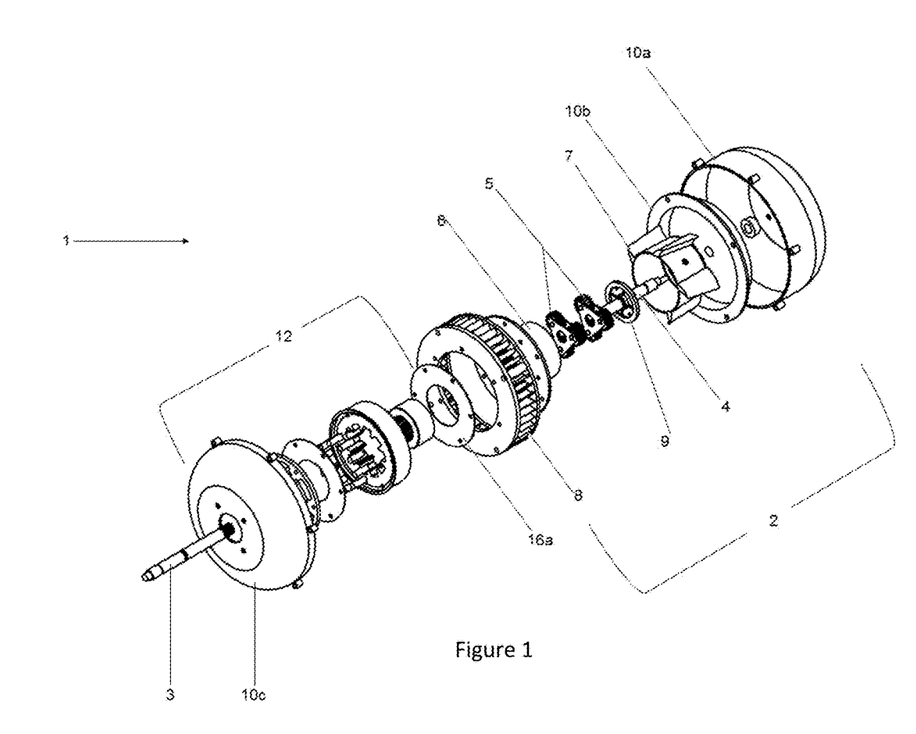
FIG. 1 shows a representation of an expanded perspective view of the assembly of components of the automatic inertial continuously variable transmission of the present invention.
Figure 2:
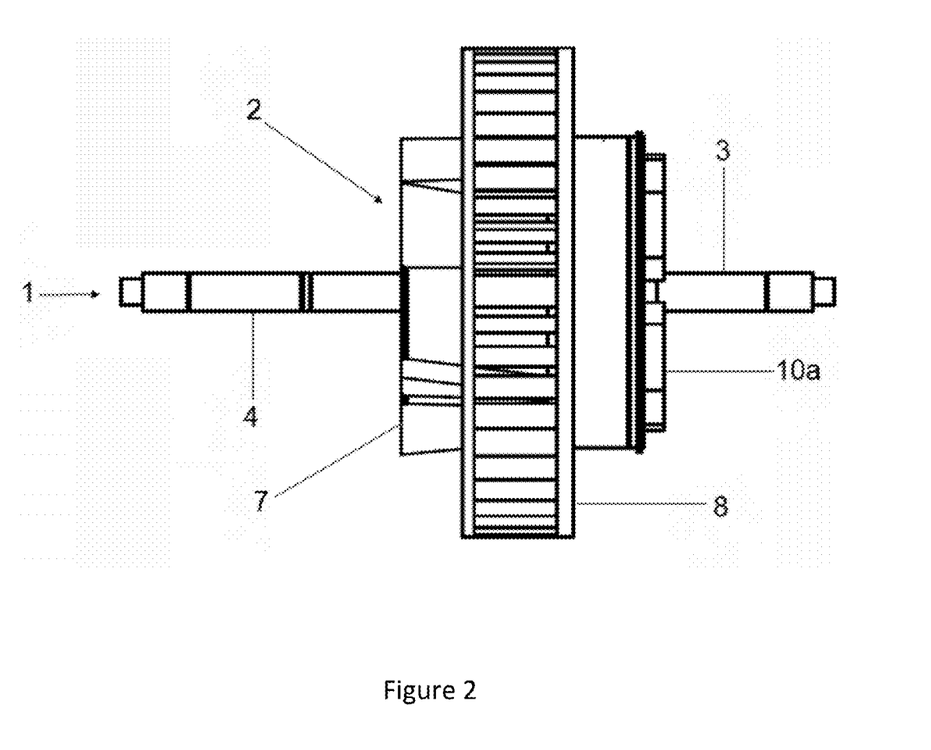
FIG. 2 shows a representation of a perspective view of the mechanism of engagement of the drive shaft and driven shaft of the reduction system.

The present invention describes an automatic inertial continuously variable transmission (1) capable of transmitting torque from an engine to wheels of a vehicle. As can be seen in FIG. 1, the automatic inertial continuously variable transmission (1) comprises:

scaling elements (2), that transfers torque from the motor, transferred by the drive shaft (3) to the driven shaft (4);
a drive shaft (3) which transfers the torque produced by the engine to the scaling elements (2);
a driven shaft (4) which transfers the force produced by the scaling elements (2) to the wheels of the vehicle;
a lock (12);
casings (10a, 10b and 10c).

The scaling elements (2) are a set of components, comprising:
(i) a planet gear set (5);
(ii) a ring gear (6);
(iii) an impeller (7);
(iv) a turbine (8);
(v) a ring junction (9);

The scaling elements (2) are immersed in a fluid lubricant such as lubricating oil.

The planet gear set (5) causes the reduction of rotation brought from the engine to the scaling elements (2) by the drive shaft (3), and transfers the force resulting from the reduction to the driven shaft (4).

Figure 3:
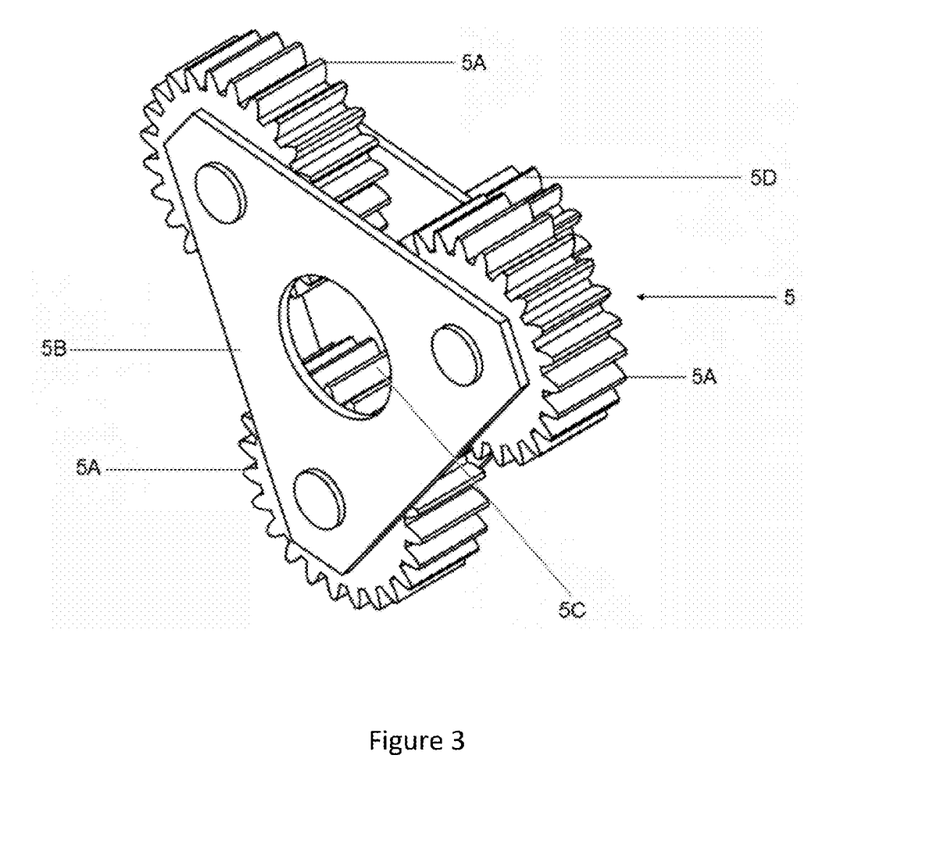
FIG. 3 shows a view of the planet gear set and its component parts.

In FIG. 3 it can be seen that the planet gear set (5) has a rigid frame (5B), which interconnects the planet gears (5A) having orbital movement. The rigid frame (5B) has a triangular shape and interconnects three planet gears (5A), which are positioned, at angles of 120° from each other.

Figure 4:
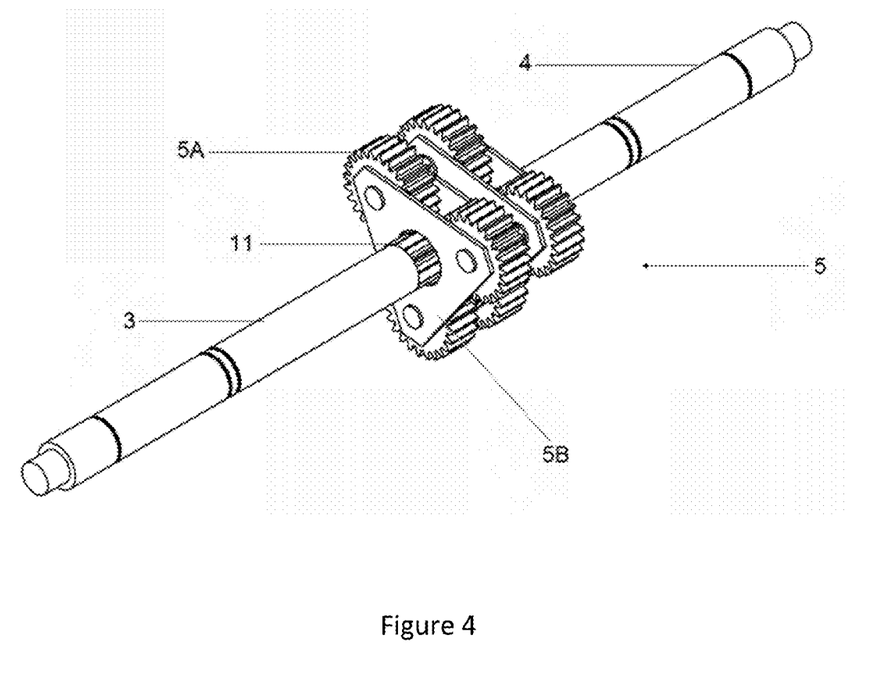
FIG. 4 shows a perspective view in detail of the planet and sun gear set that are mounted within the ring gear.
Figure 5:
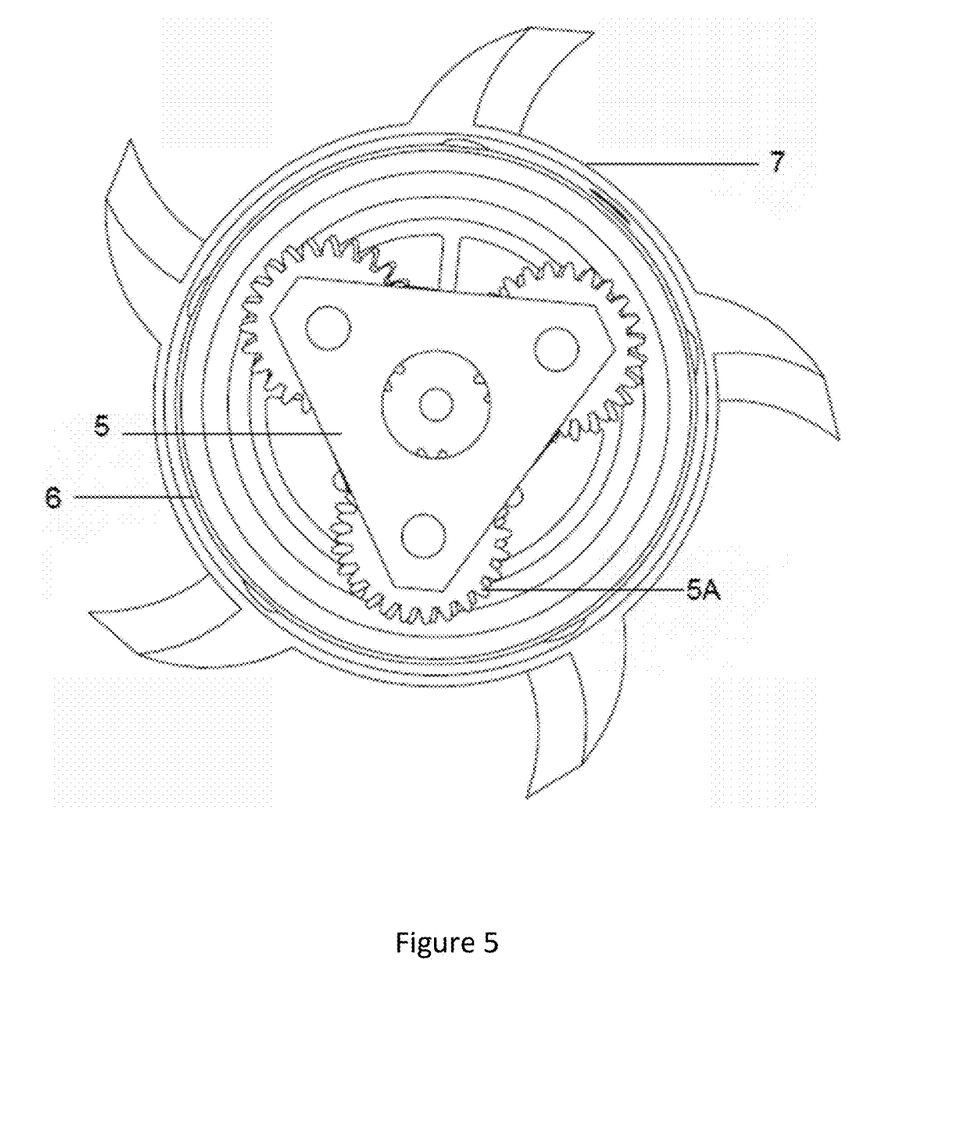
FIG. 5 shows a front view of the planetary gear set inserted into the impeller.

The planet gear set (5) has an inlet hole (5C) and an output gear (5D). The inlet hole (5C) serves to enable engagement of the drive shaft (3) in the planet gear set (5). As can be seen in FIG. 4, the output gear (5D) is used to connect the planetary gear set to the driven shaft (4) or to another planet gear set (5).

The illustrations contained herein have 2 planet gear sets (5), however, anyone skilled in the art will realize that may exist a variable number of planet gear sets (5), as the required reduction that one needs to achieve. The reduction effected by the planet gear ser (5), in the example of FIG. 4, is in a range of from 1:5 to 1:25, depending on the number of planet gear sets (5) contained in the automatic inertial continuously variable transmission (1) of this invention.

The ring gear (6) has a toothed inner surface and its outer surface is smooth. This ring gear (6) is fixed to the inside of a turbine (8) and positioned around the impeller (7) is positioned without having physical contact with it. The primary function of the turbine (8) is to increase the speed of the rotation motion of the ring gear (6) positioned inside it. Because the driven shaft (4) is positioned inside the planet gear set (5) and the planet gear set (5) is positioned inside the ring gear (6), so the primary function of the turbine (8) is to increase the speed of the rotation motion of the driven shaft (4) through the planet gear set (5).

The impeller (7) is connected to the driven shaft (4) by a joining ring (9). Therefore, the impeller (7) shows solidary pivotal movement to the driven shaft (4), but this movement may present proportionality to the driven shaft (4), not necessarily equal to 1:1.

The turbine (8) is connected to the ring gear (6) and to the hull (10b). This turbine (8) is moved by the hydraulic force generated by the impeller (7). Its function is to assist in the transfer of power to the driven shaft (4), making the gear ratios vary continuously.

The ring junction (9) connects the impeller (7) to the driven shaft (4), enabling solidary movement of the impeller (7) to the driven shaft (4).

The impeller (7) presents in its external face elements belonging to the group comprised of blades, magnets or grooves. Preferably the external face of the impeller (7) presents blades (as in FIG. 1). The structure on the external face of the impeller (7) generates extra power, that can be hydraulic, magnetic or traction forces, depending on the type of coupling (hydraulic, magnetic or drag), which will be transferred to the turbine (8).

Thus, the conversion of the rotation produced by the drive shaft (3) and their transfer to the driven shaft (4) is due to both the force transferred directly to the planet gear sets (5), as well as by the force generated by the impeller (7) on the turbine (8).

The way it is exemplified in the figures presented, the impeller (7) has blades on its outer side. Because all scaling elements (2) become immersed in lubricating fluid, the impeller (7) blades generate a hydraulic force that causes the turning of the turbine (8). Thus, as the ring gear (6) is fixed to the turbine (8), the ring gear (6) and the turbine (8) rotate together.

The rotation movement of the ring gear (6) is transferred to the planet gear set (5) passing to rotate faster and transfers this increase in the speed to the driven shaft (4) and consequently to the impeller (7), creating a feedback of forces in this automatic inertial continuously variable transmission (1).

Figure 6:
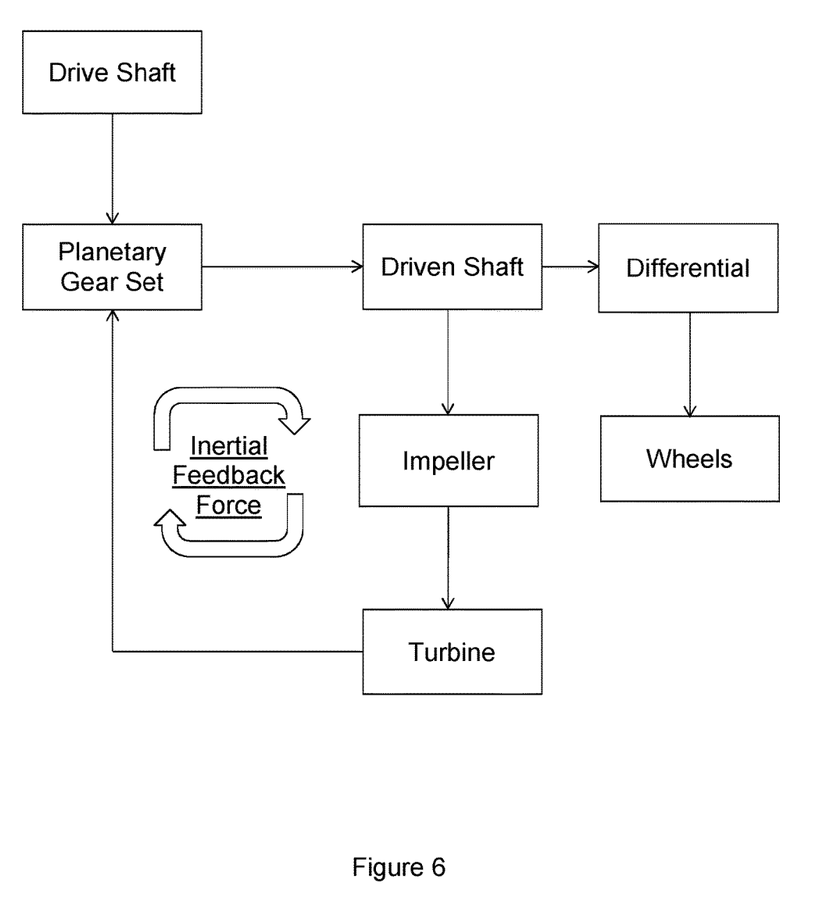
FIG. 6 shows a flowchart representing an Instantaneous Inertial Feedback force that occurs between the components of scaling elements.

As can be seen in the flowchart of FIG. 6, the feedback of forces generated by the action of the impeller (7) on the other components of the scaling elements (2) changes the rotation reduction effected by the planet gear set (5) for a range between 1:25 to 1:1, depending on the variation of the moment of inertia of the vehicle.

Casings (10a, 10b and 10c) serve to coat and to protect the automatic inertial continuously variable transmission (1). These casings have orifices that allow the drive shaft (3) and driven shaft (4) to pass through.

The scaling elements (2) are thus responsible for converting rotation produced by the drive shaft (3) and their transfer to the driven shaft (4) due to both the force transferred directly from the planet gear set (5), as the force generated by the impeller (7) on the turbine (8).

The drive shaft (3) serves to take the torque produced by the engine to the scaling elements (2). One end of the drive shaft (3) is connected to the vehicle motor and the other end is inserted into the scaling elements (2). As shown in FIG. 4, the end of the drive shaft (3) which is inserted in the scaling elements (2) has a sun gear (11), that has teeth which fit precisely within the planet gear set (5), moving planet gears (5A).

The driven shaft (4) connects to the planet gear set (5), the impeller (7) and the drive wheels of the vehicle. The function of the driven shaft (4) is to transfer the force produced by scaling elements (2) to the wheels of the vehicle. The result of this conversion may be speed, force, and a combination of speed and force, according to the inertial moment of the vehicle.

The linear moment of the vehicle is important for this automatic inertial continuously variable transmission (1) because the impeller (7) is fixed directly on the driven shaft (4), so the rotation of the driven shaft (4) has a directly relation to the force that the impeller (7) produces on the turbine (8). The force produced by the impeller (7) on the turbine (8), and therefore the ring gear (6) is transferred back to the planet gear set (5) that causes an increase of the rotation of the driven shaft (4). This succession of transfer of forces between the components of this automatic inertial continuously variable transmission (1) occurs quickly and without the usual bumps produced by the automatic transmission systems belonging to the state of the art.

Figure 7:
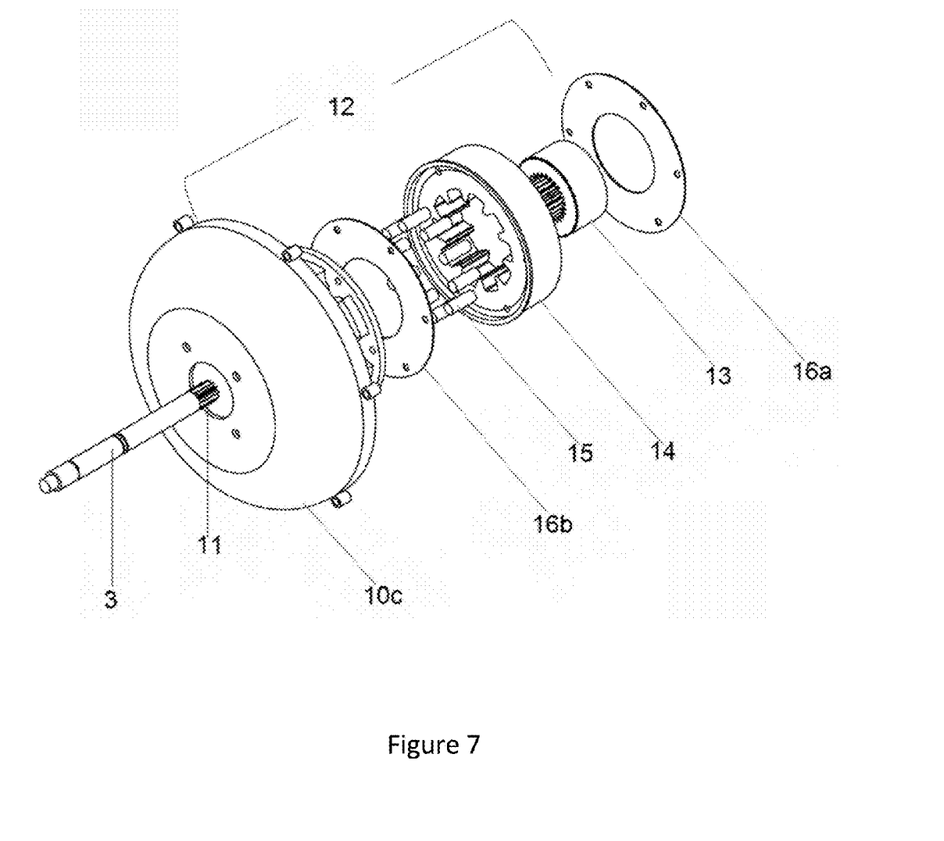
FIG. 7 shows a representation of the exploded view of the components of the lock.

FIG. 7 illustrates the lock (12), which is a component of the automatic inertial continuously variable transmission (1), comprising the following elements:

(i) a toothed support (13);

(ii) a drum (14);

(iii) pin and springs (15);

(iv) joining rings (16a, 16b).

The toothed support (13) which is internally toothed and must be inserted within the drum (14) has the function of controlling the direction of rotation of the drum.

The drum (14) is responsible for stopping the scaling elements (2), working fixed to the turbine (8).

The pins and springs (15) act jointly for breaking the drum (14).

The joining rings (16a and 16b) are inserted on the drum (14) and serve to prevent the wear generated by the movement of the drum (14) and the turbine (8).

As the drum (14) is fixed to the satellite element (6) both always rotate in the same direction. Thus, when the toothed support (13) allows the rotation of the drum (14) is the same direction of rotation of the drive shaft (3) the automatic inertial continuously variable transmission (1) promotes the continual scaling of the vehicle gears, enabling the gear shifting occur quickly and without bumps, however, when the toothed support (13) allows the drum (14) rotate in opposite direction to the drive shaft (3) the automatic inertial continuously variable transmission (1) remains attached, without, however, to transmit the rotation to the driven shaft (4), thus acting as a built-in clutch.

As can be understood by those skilled in the art, the automatic inertial continuously variable transmission (1) of this invention has a reduced number of mechanical components, which reduces the cost of production of the object of this invention, compared to the state of the art automatic transmissions.

In addition, although preferably the applications of automatic inertial continuously variable transmission (1) intended to transmit torque from an automotive vehicle engine to the drive wheels, it can also be applied, in an unlimited way, to the axis of an electric motor of an electric vehicle, the electric motors of tools and appliances, in wind turbines, in electrical and conventional bicycles as well as motorcycles.

Although specific embodiments of the invention have been presented, all those who are reasonably well skilled in the art will appreciate the possibility of changes in these embodiments without departing from the spirit and scope of the invention, which is the feedback.

Therefore, the embodiments described above should be provided with an illustrative and not restrictive character. The invention shall not be interpreted as being limited to their particular embodiments described above. Thus, additional variations to the embodiments described above should be taken into account by those skilled in the art.

The examples are provided merely illustrative of the present embodiment of the invention, and are based on tests conducted. These examples, therefore, ought not to be employed in defining the rights of inventors.

EXAMPLE 1

Performance Acceleration Test

Figure 8:
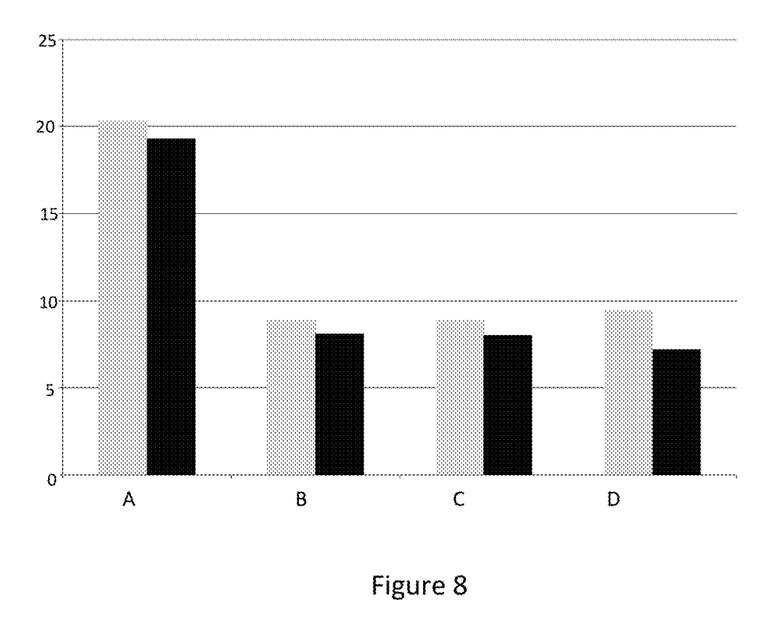
FIG. 8 shows a graphical representation of a performance test speed.

A simulation of a performance test acceleration 0-100 km/h was performed. The graphic in FIG. 8 shows the result of simulation, where:
Gray=standard vehicle transmission,
Black=automatic inertial continuously variable transmission (1) object of this invention.
X-axis:
A=Fiat Palio,
B=Audi A1,
C=Honda Civic,
D=Hyundai Vera Cruz.
Y-axis:
Time in seconds.

Table 1 below shows the data obtained from the analysis of the graphic in FIG. 8 where it can be seen that all of the vehicles tested had a performance gain during use of the automatic inertial continuously variable transmission (1) of this invention in comparison with the use of the original vehicle transmission.

TABLE 1

Performance acceleration 0 to 100 Km/h

| Vehicle | % gain in time (0 to 100 Km/h) in seconds |
|---------|-------------------------------------------|
| A | 5 |
| B | 9 |
| C | 10 |
| D | 24 |

EXAMPLE 2

Performance Testing—Revolutions Per Minute (RPM)

The maximum rotation during these first tests was maintained at 5000 RPM, lower than the maximum rotation power of the engines of most cars used in the simulations. Table 2 below shows the test results.

TABLE 2

Time versus Rotation output, in automatic inertial continuously variable transmission

| Hyundai Veracruz | | Audi A1 | | Honda Civic | | Fiat Palio | |
|---|---|---|---|---|---|---|---|
| Time (s) | Rotation (rpm) | Time (s) | Rotation (rpm) | Time (s) | Rotation (rpm) | Time (s) | Rotation (rpm) |
| 0 | 0 | 0 | 0 | 0 | 0 | 0 | 0 |
| 1 | 20 | 1 | 15 | 1 | 18 | 1 | 9 |
| 2 | 50 | 2 | 32 | 2 | 39 | 2 | 26 |
| 3 | 130 | 3 | 117 | 3 | 122 | 3 | 39 |
| 4 | 310 | 4 | 260 | 4 | 295 | 4 | 53 |
| 5 | 591 | 5 | 566 | 5 | 575 | 5 | 73 |
| 6 | 983 | 6 | 945 | 6 | 957 | 6 | 97 |
| 7 | 1890 | 7 | 1813 | 7 | 1831 | 7 | 122 |
| 8 | 3621 | 8 | 3527 | 8 | 3544 | 8 | 143 |
| 9 | 5000 | 9 | 5000 | 9 | 5000 | 9 | 172 |
| | | | | | | 10 | 219 |
| | | | | | | 11 | 311 |
| | | | | | | 12 | 433 |
| | | | | | | 13 | 591 |
| | | | | | | 14 | 767 |

TABLE 2-continued

Time versus Rotation output, in automatic inertial continuously variable transmission

| Hyundai Veracruz | | Audi A1 | | Honda Civic | | Fiat Palio | |
|---|---|---|---|---|---|---|---|
| Time (s) | Rotation (rpm) | Time (s) | Rotation (rpm) | Time (s) | Rotation (rpm) | Time (s) | Rotation (rpm) |
| | | | | | | 15 | 997 |
| | | | | | | 16 | 1320 |
| | | | | | | 17 | 1892 |
| | | | | | | 18 | 2712 |
| | | | | | | 19 | 3631 |
| | | | | | | 20 | 4321 |
| | | | | | | 21 | 5000 |

The invention claimed is:

1. An automatic inertial continuously variable transmission comprising:
   (a) scaling elements (2) comprising:
      (i) a planet gear set (5); (ii) a sun gear (11); (iii) a ring gear (6); (iv) an impeller (7); and (v) a turbine (8) directly connected to the ring gear (6)
   (b) a drive shaft (3), attached to the sun gear (11) at one end; and connected to an engine and to the scaling element; transferring a power produced by the engine to the scaling elements (2);
   (c) a driven shaft (4) directly connected to the impeller (7) transferring the power produced by the scaling elements (2) to wheels of a vehicle;
   (d) a lock (12) comprising:
      (i) a toothed support (13);
      (ii) a drum (14) fixed to the turbine (8), constructed and arranged to brake the scaling elements;
      (iii) pin and springs (15) constructed and arranged to brake the drum (14) of the lock (12);
      (iv) joining rings (16a, 16b); and
   (e) casings (10a, 10b and 10c), protecting the automatic inertial continuously variable transmission (1);
   wherein the sun gear (11) rotates the planet gear set (5) which moves the driven shaft (4) connected to the impeller (7) which produces a force on the turbine (8), which adds force to the ring gear (6), which then rotates the planet gear set (5), generating an instantaneous inertial feedback force, causing a variation in a speed and torque on the driven shaft (4).

2. The automatic inertial continuously variable transmission according to claim 1, wherein the scaling elements (2) are immersed in a lubricating fluid.

3. The automatic inertial continuously variable transmission according to claim 1, wherein the impeller (7) includes blades on an external face, generating additional hydraulic power to be transferred to the turbine (8).

4. The automatic inertial continuously variable transmission according to claim 1, wherein when the toothed support (13) enables the drum (14) and the ring gear (6) to only rotate in the same direction of the drive shaft, the transmission works as a CVT; and wherein when the toothed support (13) enables the drum (14) and the ring gear (6) to only rotate in an opposite direction of the drive shaft, the transmission works as a clutch, enabling the transmission to remain engaged without transferring power to the wheels, transferring the power to the rotation of the turbine in the opposite direction of the drive shaft.

* * * * *